N. WASHBURN.
Rolling Wheel Tires.
No. 23,414.  Patented March 29, 1859.
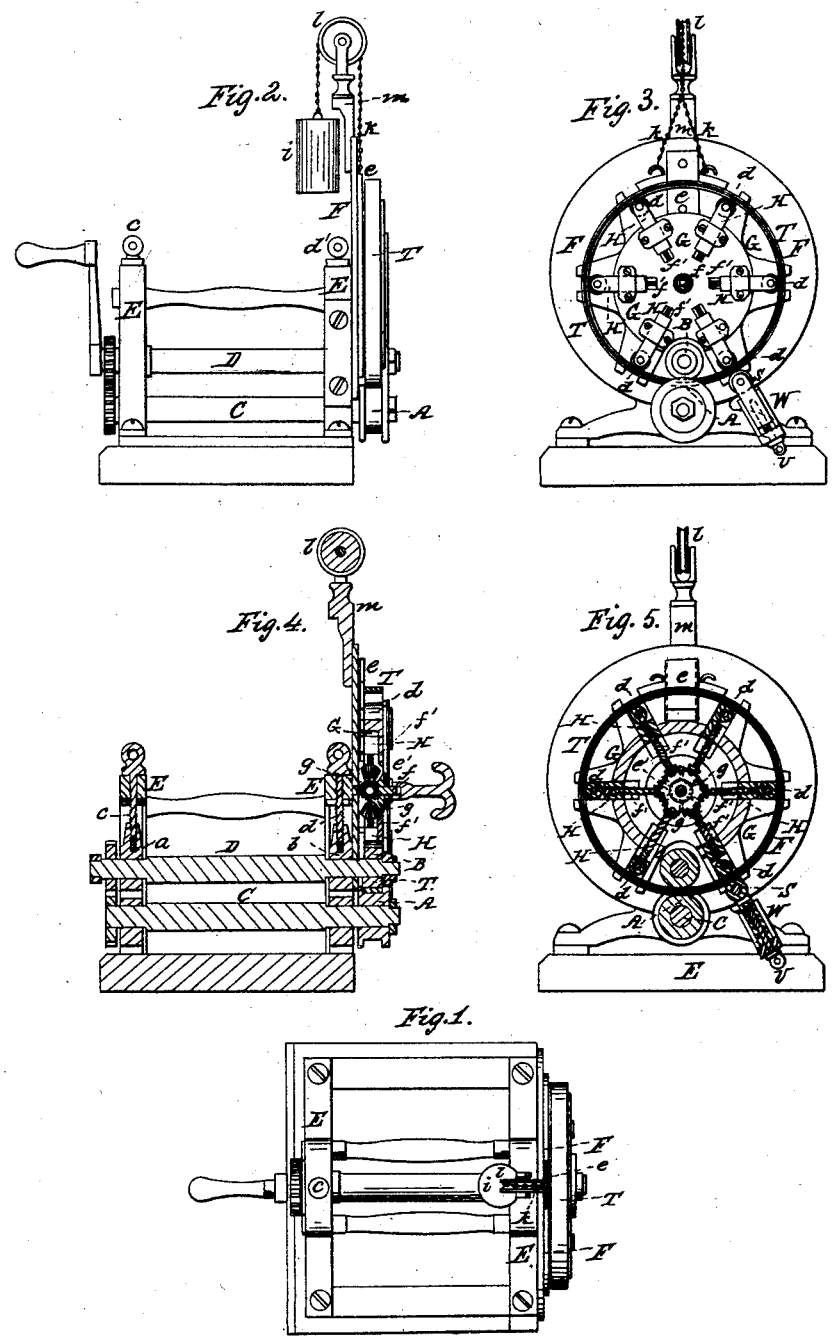

UNITED STATES PATENT OFFICE.

NATHAN WASHBURN, OF WORCESTER, MASSACHUSETTS.

MACHINE FOR ROLLING WHEEL-TIRES.

Specification of Letters Patent No. 23,414, dated March 29, 1859.

*To all whom it may concern:*

Be it known that I, NATHAN WASHBURN, of the city and county of Worcester and State of Massachusetts, have invented a new and useful or Improved Machine for Rolling Tires for Wheels; and I do hereby declare that the nature of my said invention and the manner in which it is to be performed or is constructed and made to operate are hereinafter fully described, reference being had to the accompanying drawings, which make a part of my specification, and of which—

Figure 1, denotes a top view. Fig. 2, a side elevation. Fig. 3, a front elevation, and Fig. 4, a longitudinal and vertical section of such machine. Fig. 5, is a vertical section taken at right angles to the axis of and through the series of adjustable carrying rollers and their supporting frame or holder.

The nature of my invention consists in a combination of a set of reducing rollers, a series of adjustable carrying rollers, (or their equivalents) and a frame or holder thereof (that is of the carrying rollers) supported so as to be capable of rising upward within the wheel tire in proportion as the diameter of the inner periphery of the said tire may increase during the process of rolling the tire, the said carrying rollers being arranged and made adjustable with respect to their holder and the reducing rollers in manner substantially as hereinafter specified.

The special object of my invention is not only to reduce a tire in thickness by rollers, but at the same time to impart to it, a true circular form, on its inner periphery as well as to smooth and even such periphery.

In carrying out my invention therefore I make use of a pair or set of reducing rollers A, B, mounted respectively on two shafts C, D, arranged within a suitable frame E. The boxes $a$, $b$, of the superior shaft D, may be applied to the frame so as to be capable of being elevated or depressed therein by means of screws $c$, $d$, or other suitable equivalents, and so as to enable the distance between the peripheries of the two reducing rollers to be changed as circumstances may require.

To one end of the frame E, a circular plate or disk F, may be applied, the same being arranged with respect to the reducing rollers A, B, as shown in the drawings. Against the outer face or surface of the plate F, and projecting therefrom is a vertical guide ledge $e$, which in its horizontal section is dovetailed for the purpose of receiving and maintaining in its place against the plate F, the main frame or holders G, of the series of carrying rollers $d$, $d$, $d$, $d$, $d$, $d$, each of which is supported in an adjustable carrier H, and has its axis parallel to that of each of the rollers A, B. Each carrier H, should be applied to the frame G, so as to be capable of being moved in a radial direction, either toward or away from the center of the frame or a bevel gear $e'$, fixed on the shaft $f$, arranged at the central part of the frame G, as shown in the drawings. Furthermore to each carrier H there is a screw $f'$, which screws into it lengthwise and is so held by the frame G, as to be capable of being rotated axially therein, but without having any longitudinal movement within the frame. Each screw is provided with or has affixed to its inner end a bevel gear $g$, to work into the gear $e'$.

The frame or holder G, is overbalanced by means of a weight $i$, attached to a chain $k$, which passes around a sheave $l$, (at the upper part of a standard or post $m$,) and is attached to the said holder G, the whole being as shown in the drawings. Each of the screws $f'$, $f'$, should be made exactly alike. The same may be said of the bevel gears affixed to their inner ends. The form of the periphery of each of the reducing rollers A, B, may be such as may produce the form in transverse section that it may be desirable for the wheel tire to have. The drawings exhibit the rollers as constructed in a manner so as to represent a rectangular section to the tire, and they represent the tire at T, by red lines and show the manner in which it encircles and is supported by the series of carrying rollers $d$, $d$. The drawings also show a guide and supporting roller S, carried by a frame $w$, having an adjusting screw $v$, by which the roller may be moved either toward or away from the series of carrying rollers, the position of the said roller being as shown in Fig. 3. Such roller S bears and rolls against the outer periphery of the tire, and may or may not be used. Sometimes it may be employed to advantage.

By placing a key or a crank on the shaft $f$, and turning it, all the screws $f'$, $f'$, of the carrying roller carriages will be simultaneously put in revolution, and so as to cause the said carriages and their rollers either to move away from or be moved toward the shaft $t$, as circumstances may require. By such means we have the opportunity of forcing the carrying rollers into close contact with the inner periphery of the tire while being revolved by and between the reducing rollers. The carrying rollers will operate therefore not only to form the tire truly circular, but to roll and smooth its inner peripheral surface. Furthermore, as the tire may increase in diameter, the holder or frame G, of the carrying rollers will be raised upward by the action of the weight $i$, and thus the series of carrying rollers will be made concentric with the tire in proportion as it may increase in diameter.

My machine has been found to operate to great advantage in the manufacture of tires for railway wheels. By means of it their inner peripheries are not only made truly circular, but they are so smoothly and exactly prepared as to be ready at once without further finishing to be applied to wheels and thus all the usual labor and time generally expended in fixing the tire to and being turned in a lathe is avoided by my invention.

What therefore I claim is—

The combination of a set of reducing rollers A, B, a series of adjustable carrying rollers $d$, $d$ $d$ &c (or their equivalents) and a frame or holder G, supported so as to be capable of rising upward within the wheel tire in proportion as the diameter of the inner periphery of the said tire may increase during the process of rolling the tire, and having the said carrying rollers arranged and made adjustable with respect to it and the reducing rollers in manner substantially as hereinbefore specified.

In testimony whereof I have hereunto set my signature.

N. WASHBURN.

Witnesses:
 R. H. EDDY,
 ARTHUR NEILL.